Aug. 7, 1962 P. P. CARTIER 3,048,785
PULSE GENERATING AND TIMING CIRCUIT FOR GENERATING
PAIRED PULSES, ONE MORE NARROW THAN THE OTHER
Filed Dec. 21, 1959
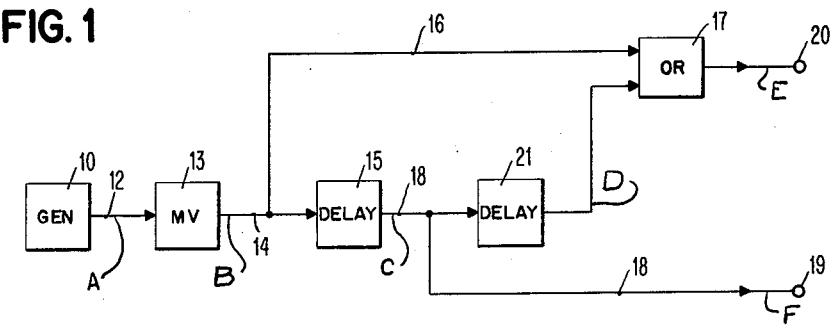
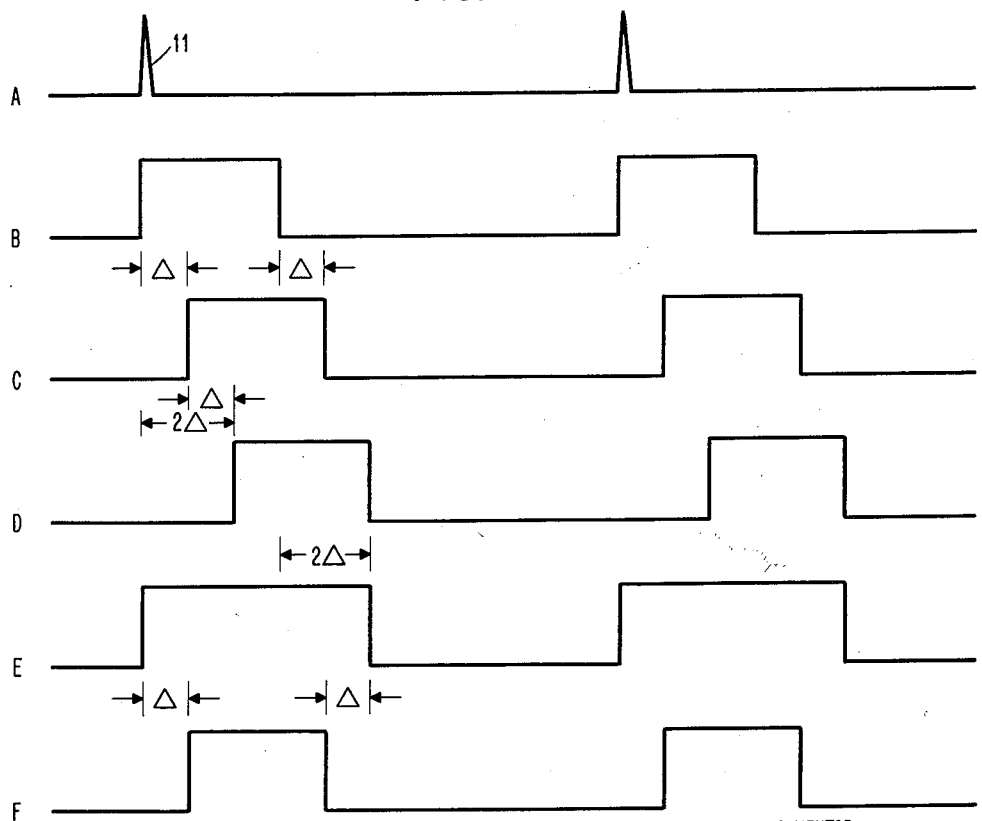
INVENTOR
PHILIP P. CARTIER
BY
*Harry T. Berriman*
AGENT

United States Patent Office 3,048,785
Patented Aug. 7, 1962

3,048,785
PULSE GENERATING AND TIMING CIRCUIT FOR GENERATING PAIRED PULSES, ONE MORE NARROW THAN THE OTHER
Philip P. Cartier, Wappingers Falls, N.Y., assignor to International Business Machines Corporation, New York, N.Y., a corporation of New York
Filed Dec. 21, 1959, Ser. No. 861,056
5 Claims. (Cl. 328—62)

This invention relates to electrical pulse generating circuits and more particularly to such circuits for accurately time positioning electrical pulses in a predetermined relationship to each other.

The invention particularly provides circuitry for producing two timing pulses wherein one pulse of short duration is accurately centered within the longer time period of the other pulse. In prior art devices such a result is usually achieved by providing two single-shot multivibrators, one multivibrator having a shorter period than the other. In such an arrangement a triggering pulse is usually applied directly to the long duration multivibrator to initiate a cycle thereof while the same triggering pulse is applied through a delay device to the short period multivibrator. With the proper choice of delay interval for the delay device, it is possible to initiate the start of the short multivibrator period within the period of the long period multivibrator. Thereafter, the exact position of the end time of the short period cycle to the end time of the long period cycle, depends on the accuracy of the periods of the two multivibrator devices. Since most single-shot multivibrators drift and are able to maintain a predetermined period accuracy of only ±30%, it is evident that it becomes extremely difficult to insure that the shorter duration pulse will never drift outside of the longer duration pulse, particularly where there is not too much difference in the relative duration of the two pulses.

In the subject invention, circuitry comprised of only one single-shot multivibrator, a logic circuit element and delay devices are combined in a manner so that a pulse of short duration is generated accurately centered as to both leading and trailing edges within the time period of a generated pulse of longer duration. The short pulse will never drift out from under the long pulse and the circuit is independent of any drift or the tolerance of the single-shot multivibrator utilized.

It is accordingly an object of the invention to provide an improved circuit for generating electrical pulses of different pulse widths and with the different width pulses being accurately maintained in an accurate predetermined time relationship to each other.

It is another object to provide an improved circuit means for generating and maintaining electrical pulses in particular timed relationship to each other.

It is a still further object to provide an improved circuit means for generating a pair of electric pulses and wherein one of the pulses always falls within the time period of the other in a very accurately determined and unvarying fashion.

It is yet a further object to provide improved and simplified circuit apparatus for generating a pair of electrical pulses of different time durations and wherein one of the pulses is accurately centered within the time period of the other pulse.

The foregoing and other objects, features and advantages of the invention will be apparent from the following more particular description of a preferred embodiment of the invention, as illustrated in the accompanying drawings.

In the drawings:

FIG. 1 is a circuit diagram of the improved pulse generating and timing circuit.

FIG. 2 is a timing diagram of the pulse waveforms at different circuit points in the circuit of FIG. 1.

Referring now to FIG. 1, the improved circuit comprises a pulse source 10 of any conventional type which generates a repeating positive signal 11 as indicated by the waveform A in FIG. 2. The output waveform of pulse generator 10 is applied through a conductor 12 to a conventional single-shot multivibrator 13 and in response to each applied pulse 11, the multivibrator goes through one cycle of operation as indicated by waveform B in FIG. 2. The waveform B generated in the output of the single-shot 13 is applied through a conductor 14 to the input of a pulse delay unit 15 and also through a conductor 16 to the one input of an OR circuit element 17.

The delay element 15 is any type of well known pulse delay element and serves to generate on its output a pulse similar to the pulse applied to its input except delayed by some predetermined interval which may be deferred as Δ (delta). Thus in FIG. 2 waveform C shows the output from the delay unit 15 and it will be noted that the waveform is similar to the waveform B except that the leading and trailing edges are each delayed by the time interval Δ. The output waveform C from unit 15 is applied through conductor 18 to the output terminal 19 and is defined as output waveform F for the circuit. It will be noted that, waveforms C and F are actually the same waveform.

The OR circuit 17 is a conventional OR logic element having a pair of inputs and an output connected to the output terminal 20. The OR circuit element will generate on its output a signal when a signal is applied to either one or its other input or when signals are applied to both inputs. It will be recalled that the output from the multivibrator is applied through conductor 16 to the one input of OR element 17. Thus, as the multivibrator output signal rises, OR element 17 responds and its output also rises as indicated by the leading edge of the waveform E in FIG. 2.

The output of delay unit 15, in addition to being applied to the output terminal 19, is also applied to the input of another delay unit 21, the output of the latter being applied to a second input of the OR circuit 17. The delay unit 21 is identical to the delay unit 15 and has the same delay interval Δ. Consequently, the waveform output from unit 21 is identical to the output from delay unit 15 except delayed a time interval Δ as indicated in waveform D. It will also be noted that the output waveform D is similar to the output directly from the multivibrator 13 except delayed 2 Δ time intervals by the combined action of delay units 15 and 21. With this output waveform D in FIG. 2 also applied to the OR circuit 17, it is evident from an examination of FIG. 2 that as the multivibrator output falls (waveform B), the delayed waveform D is already present at the second input of OR circuit 17 so that this circuit continues its output. The output from OR circuit 17 accordingly starts with the rise of the multivibrator waveform B and continues until the fall of the waveform D which occurs 2 Δ time intervals after the fall of the multivibrator waveforms. The output waveform from the OR circuit 17 is accordingly as represented by the waveform diagram E in FIG. 2.

Referring still to FIGS. 1 and 2, it will be noted that the previous mentioned output waveform F rises one time interval Δ before the rise of the OR circuit output waveform E and also falls one time interval Δ before the fall of the waveform E. It is thus evident that by the use of one single-shot multivibrator there has been obtained an output waveform F which is exactly centered within the output waveform E. If the period of the multivibrator should vary this in no way can cause the waveform F to vary in shift relative to the waveform E since by reason of the previously explained action of delay units 15 and 21 and the OR circuit 17, waveform E rises 1 Δ before and falls 1 Δ after the waveform F from the first delay element.

It will be noted in the operation of FIG. 1 described above, that one of the reasons that the waveform F is always centered relative to the waveform E results from the time delay interval of the delay units 15 and 21 being identical. It will be appreciated that, if desired, the delay intervals may be dissimilar which will cause one output waveform such as F to be shifted relative to the position of the other output waveform. Once these delay intervals of the two units 15 and 21 are fixed, however, there is no shifting in the relative positions of the output waveforms even though the period of the multivibrator may vary.

It will also be appreciated that although the circuit shown in FIG. 1 provides only two output waveforms with the waveforms being accurately fixed in time relative to each other, the circuit could be expanded in an obvious manner by the addition of other logic blocks similar to unit 17 and other delay units such as 15 and 21 connected in appropriate points in the circuit so as to give three or more output waveforms, all of the waveforms being accurately fixed in time relative to each other. This expanded circuitry, as the circuitry in FIG. 1, would use only one single-shot multivibrator and the desired accurate time relationship of the output waveforms would be obtained regardless of any variation in the period of the multivibrator.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for generating a wide and a narrow pulse, the narrow pulse being accurately centered relative to both the leading and trailing edges of the wider pulse, comprising, in combination, a single-shot multivibrator, a signal source for driving said multivibrator, first and second signal delay elements, said elements having identical delay intervals, an OR circuit having a pair of inputs and an output for providing said wide pulse, circuit means connecting an output of said multivibrator to one of said OR circuit inputs, and also connecting said multivibrator output through said two delay units in series to the other input of said OR circuit, said narrow pulse being generated at the junction between said two serially connected delay units.

2. Apparatus for generating a pair of electrical pulses in accurate time relationship comprising, in combination, a single-shot multivibrator including driving means therefor, first and second delay elements, an OR circuit, circuit means for directly connecting the output of said single-shot to one input of said OR circuit and for indirectly connecting the output of said single-shot though said two delay units in series to another input of said OR circuit, one of said pair of pulses appearing in the output of said OR circuit, and the other appearing at the junction of said two delay units.

3. Apparatus for generating a pair of electrical pulses in accurate time positions relative to each other comprising, in combination, a single-shot multivibrator including driving means therefor, first and second delay elements connected in series, the combined delay interval provided by said delay elements being less than the time width of the output waveform from said multivibrator, an OR circuit, circuit means for directly connecting the output of said multivibrator to one input of said OR circuit and for indirectly connecting the output of said multivibrator through said series connected delay units to another input of said OR circuit, one of said pair of pulses being generated at the output of said OR circuit, and the other being generated at the junction of said two delay units.

4. Apparatus as in claim 3 further characterized by the fact that said delay elements provide the same time interval signal delay action.

5. Apparatus as in claim 3 further characterized by the fact that said delay elements provide dissimilar time interval signal delay action.

References Cited in the file of this patent
UNITED STATES PATENTS

| | | |
|---|---|---|
| 2,707,751 | Hance | May 3, 1955 |
| 2,784,310 | Cowan | Mar. 5, 1957 |
| 2,824,958 | Dunn | Feb. 25, 1958 |
| 2,879,504 | Howell et al. | Mar. 24, 1959 |
| 2,892,083 | Norris | June 23, 1959 |